Aug. 24, 1926.

R. J. BROWN

EDUCATIONAL DEVICE

Filed Nov. 14, 1925    2 Sheets-Sheet 1

Inventor
R. J. Brown
By D. Swift
Attorney

Aug. 24, 1926.

R. J. BROWN 1,597,177

EDUCATIONAL DEVICE

Filed Nov. 14, 1925

Inventor
R. J. Brown
By D. Swift
Attorney

Patented Aug. 24, 1926.

1,597,177

UNITED STATES PATENT OFFICE.

ROBERT J. BROWN, OF BEAUMONT, TEXAS, ASSIGNOR OF ONE-HALF TO JOHN W. REAMS, OF OKLAHOMA CITY, OKLAHOMA.

EDUCATIONAL DEVICE.

Application filed November 14, 1925. Serial No. 69,044.

The device relates to educational devices and has for its object to provide an educational device particularly adapted for use in schools and constructed whereby an ocular demonstration can be given of the movement of the earth on its axis and simultaneously in its orbit for illustrating the movement of the earth.

A further object is to provide a horizontally disposed frame having an upwardly extending apertured flange adjacent its outer edge, a centrally disposed rotatable shaft having a worm gear at its lower end and a sprocket at its upper end and which sprocket is provided with a sprocket chain which extends around a vertically disposed shaft rotatably mounted in a sleeve, the upper end of which terminates in an angular portion and which sprocket and sprocket chain rotate the last named shaft and the globe carried by the angle portion of the shaft for simulating the rotation of a globe on the angular portion of the shaft on its axis in relation to a light disposed centrally of the device. Also to provide an arm pivoted centrally of the device and connected to a sleeve in which the globe carrying shaft is rotatably mounted and the arm with a vertically disposed shaft, the lower end of which is provided with a gear, the teeth of which engage in the apertures of the apertured flange and the upper end of which shaft is provided with a gear which meshes with a smaller gear carried by the globe supporting shaft and which has a gear connection with the globe whereby upon a rotation of the arm for moving the globe in its orbit and the axis, said globe will be simultaneously rotated to assume proper positions in relation to the light centrally of the device, and which light represents the sun.

A further object is to provide an operating shaft below the frame of the device, and which shaft is provided with a worm which meshes with the worm gear and forms means whereby the device may be operated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
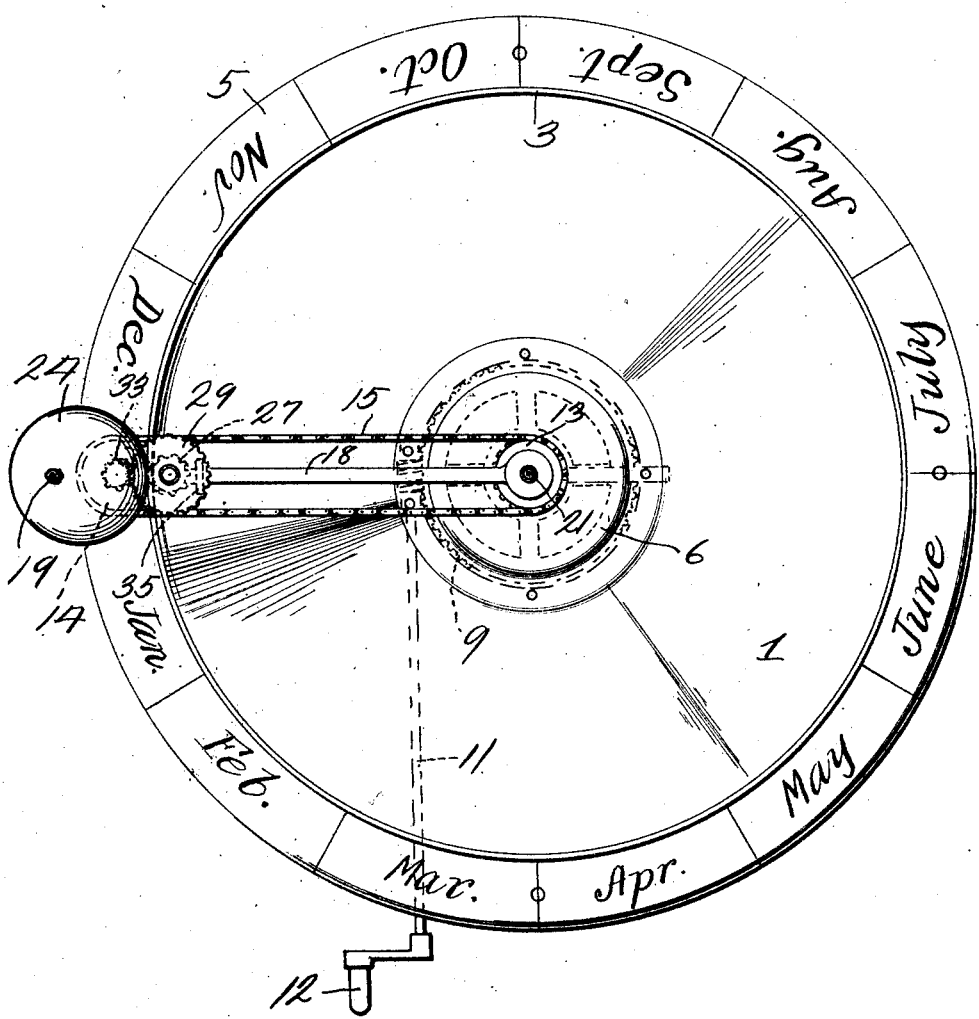
Figure 1 is a top plan view of the device.
Figure 2:
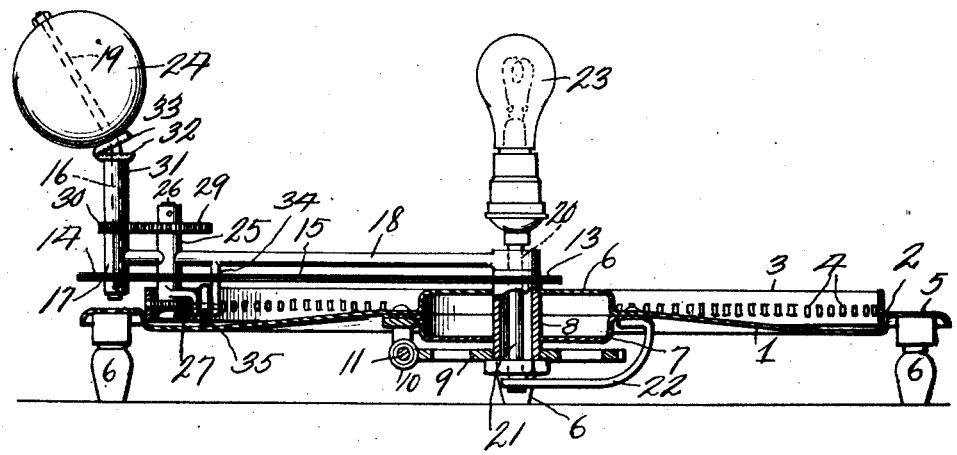
Figure 2 is a vertical longitudinal sectional view through the device.
Figure 5:
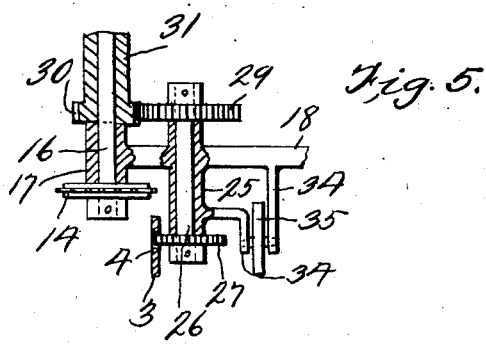
Figure 5 is a vertical longitudinal sectional view through the outer end of the pivoted arm of the adjacent mechanism.
Figure 4:
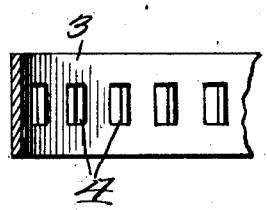
Figure 4 is an enlarged detail view of the apertured flange.
Figure 3:
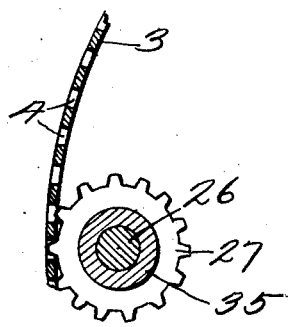
Figure 3 is a horizontal sectional view through the apertured flange showing the gear meshing therewith.

Referring to the drawing the numeral 1 designates a substantially horizontally disposed dished plate which may be stamped from a single piece of metal, and which plate is provided with an annular shoulder 2, to which may be secured by welding, an annular horizontally disposed apertured rack 3, in the apertures 4 of which gear teeth are adapted to be received. The plate 1 is provided with an outwardly extending flange 5, to the under side of which are secured downwardly extending supporting legs 6, adapted to rest on a support for supporting the device. Rotatably mounted in an upwardly struck portion 6 of the plate 1, and a dished plate 7 secured to the under side of the plate 1 is a sleeve 8, to the lower end of which is secured a worm gear 9, with which a worm 10 meshes, and which worm is carried by an outwardly extending operating shaft 11, the outer end of which is provided with a crank 12 adapted to be grasped by an operator when it is desired to rotate the gear 9. The upper end of the sleeve 8 above the plate 1 is provided with a sprocket 13, and around which sprocket and a sprocket 14, a sprocket chain 15 extends. The sprocket 14 is secured to a vertically disposed shaft 16 which is rotatably mounted in a sleeve 17, carried by the pivoted arm 18. The upper end of the shaft 16 is provided with an angularly disposed portion 19, which is inclined at about twenty-three and one-half degrees, at which angle the earth sets in relation to the sun.

The inner end of the arm 18 is rotatably mounted at 20 on the upper end of a shaft 21, and which shaft is supported at its lower end by a bracket 22 carried by the under side of the plate 1, and on the upper end of which shaft 21 a conventional form of lamp 23 is disposed which represents the sun, and around which lamp the globe 24 carried by the angular portion 19 of the shaft 16 is revolved and simultaneously revolves on its axis for simulating the position of the earth in relation to the sun during its movement in its orbit. Rotatably mounted in a sleeve 25 carried by the arm 18 is a vertically disposed shaft 26, and the lower end of which shaft is provided with a gear 27, the teeth of which mesh with the apertures 4 of the rack 3 during the rotation of the sleeve 8 and the arm 18, therefore it will be seen that as the earth 24 is moved in its orbit the shaft 26 will be simultaneously rotated, however it will be seen that it will be necessary to not only move the globe 24 in its orbit and rotate the shaft 16, but also to rotate the globe on its axis. To accomplish the above result the upper end of the shaft 26 is provided with a gear 29 which meshes with a gear 30 carried by sleeve 31, which is rotatably mounted on the upper end of the shaft 16. Sleeve 31 at its upper end is provided with a toothed disc 32, which meshes with a toothed disc 33 carried by the globe at one of its poles, therefore it will be seen that the globe 24 will be simultaneously moved in its orbit, rotated on its axis and its axis shifted in relation to the lamp 23 and the globe moved to simulate the different positions of the earth at various seasons according to its position in relation to the sun. The ratio of the gear 27 and the annular rack 3 is such that when the shaft 16 makes a complete planetary movement the globe 24 will be caused to make three hundred and sixty five rotations, representing the number of days in a year. Rotatably mounted in bearings of arms 34 carried by the arm 18 and the sleeve 25 is a roller 35, which roller engages the upper side of the plate 1 and supports the arm 18 during its rotation thereby insuring an easy steady movement of the arm during its rotation and eliminating binding or vibration.

From the above it will be seen that an educational device is provided whereby students may be given an ocular demonstration of the movement of the earth on its axis and in its orbit, and in a manner whereby it is easily remembered, and can be clearly understood.

The invention having been set forth what is claimed as new and useful is:—

1. An educational device for simulating the movement of the earth, said device comprising a base, a vertically disposed sleeve, rotatably mounted in the base, means for rotating said sleeve, a radially disposed arm carried by the upper end of the sleeve, a vertically disposed shaft carried by the outer end of the arm, sprockets carried by said shaft and the sleeve, a sprocket chain extending over said sprockets, an annular gear rack carried by the base, a vertically disposed shaft carried by the arm and rotatably mounted, a gear carried by the last named shaft and meshing with the annular rack, a gear carried by the upper end of the last named shaft, said gear meshing with a gear carried by the first mentioned shaft and rotatably mounted thereon, said first mentioned shaft being provided with an angularly disposed portion, a globe rotatably mounted on said angularly disposed portion and gear connections between the globe and the last named shaft.

2. An educational device for simulating the movement of the earth comprising a base, a sleeve rotatably mounted in said base, a support extending through the sleeve, a lamp carried by the support above the sleeve, means for rotating said sleeve, a radially disposed arm carried by the sleeve and extending towards one side of the base, a vertically disposed outer shaft carried by the end of the arm, driving connections between the outer shaft and the sleeve, an angularly disposed portion carried by the upper end of the outer shaft, a globe rotatably mounted on the angularly disposed portion, an inner shaft, gear connections between the inner shaft and the globe, an annular rack carried by the base and gear connections between the inner shaft and the annular rack.

3. An educational device for simulating the movement of the earth comprising a base, a stationary support extending through the sleeve, a lamp carried by said support above the sleeve, a sleeve rotatably mounted in said base, means for rotating said sleeve, a radially disposed arm carried by the sleeve and extending towards one side of the base, a vertically disposed outer shaft carried by the end of the arm, driving connections between the outer shaft and the sleeve, an angularly disposed portion carried by the upper end of the outer shaft, a globe rotatably mounted on the angularly disposed portion, an inner shaft, gear connections between the inner shaft and the globe, an annular rack carried by the base, gear connections between the inner shaft and the annular rack and a supporting wheel carried by the arm and engaging the base.

In testimony whereof I have signed my name to this specification.

ROBERT J. BROWN.